US008413227B2

(12) United States Patent
Chen (10) Patent No.: US 8,413,227 B2
(45) Date of Patent: Apr. 2, 2013

(54) APPARATUS AND METHOD SUPPORTING WIRELESS ACCESS TO MULTIPLE SECURITY LAYERS IN AN INDUSTRIAL CONTROL AND AUTOMATION SYSTEM OR OTHER SYSTEM

(75) Inventor: Yu-Gene T. Chen, Minden, NV (US)

(73) Assignee: Honeywell International Inc., Morristown, NJ (US)

( * ) Notice: Subject to any disclaimer, the term of this patent is extended or adjusted under 35 U.S.C. 154(b) by 828 days.

(21) Appl. No.: 12/205,156

(22) Filed: Sep. 5, 2008

(65) Prior Publication Data

US 2009/0086692 A1    Apr. 2, 2009

Related U.S. Application Data

(60) Provisional application No. 60/995,905, filed on Sep. 28, 2007.

(51) Int. Cl.
 G06F 9/00    (2006.01)
 G06F 15/16   (2006.01)
 G06F 17/00   (2006.01)
(52) U.S. Cl. ........................................................ 726/13
(58) Field of Classification Search .................. 726/13
 See application file for complete search history.

(56) References Cited

U.S. PATENT DOCUMENTS

| 3,643,183 A | 2/1972 | Geffe |
| 3,715,693 A | 2/1973 | Fletcher et al. |
| 3,758,885 A | 9/1973 | Voorman et al. |
| 4,264,874 A | 4/1981 | Young |
| 4,529,947 A | 7/1985 | Biard et al. |
| 4,614,945 A | 9/1986 | Brunius et al. |
| 4,812,785 A | 3/1989 | Pauker |
| 4,843,638 A | 6/1989 | Walters |
| 5,392,003 A | 2/1995 | Nag et al. |
| 5,428,602 A | 6/1995 | Kemppainen |
| 5,428,637 A | 6/1995 | Oliva, Jr. et al. |
| 5,430,409 A | 7/1995 | Buck et al. |
| 5,438,329 A | 8/1995 | Gastouniotis et al. |
| 5,451,898 A | 9/1995 | Johnson |
| 5,481,259 A | 1/1996 | Bane |

(Continued)

FOREIGN PATENT DOCUMENTS

| CH | 673184 | 5/1987 |
| DE | 4344172 | 12/1999 |

(Continued)

OTHER PUBLICATIONS

Thomas H. Lee, "The design of CMOS radio-frequency integrated circuits", 1998, 42 pages.

(Continued)

Primary Examiner — Kambiz Zand
Assistant Examiner — Stephen Sanders (57) ABSTRACT

A method includes receiving a message at a first wireless node. The first wireless node is associated with a first wired network, and the first wired network is associated with a first security layer. The method also includes transmitting the message over the first wired network when at least one destination of the message is located in the first security layer. The method further includes wirelessly transmitting the message for delivery to a second wireless node when at least one destination of the message is located in a second security layer. The second wireless node is associated with a second wired network, and the second wired network is associated with the second security layer. The first and second security layers may be associated with different security paradigms and/or different security domains. Also, the message could be associated with destinations in the first and second security layers.

23 Claims, 3 Drawing Sheets

U.S. PATENT DOCUMENTS

| | | | |
|---|---|---|---|
| 5,642,071 | A | 6/1997 | Sevenhans et al. |
| 5,659,303 | A | 8/1997 | Adair, Jr. |
| 5,726,603 | A | 3/1998 | Chawla et al. |
| 5,767,664 | A | 6/1998 | Price |
| 5,809,013 | A | 9/1998 | Kackman |
| 5,847,623 | A | 12/1998 | Hadjichristos |
| 5,963,650 | A | 10/1999 | Simionescu et al. |
| 5,983,350 | A | 11/1999 | Minear et al. |
| 6,052,600 | A | 4/2000 | Fette et al. |
| 6,058,137 | A | 5/2000 | Partyka |
| 6,091,715 | A | 7/2000 | Vucetic et al. |
| 6,175,860 | B1 | 1/2001 | Gaucher |
| 6,353,846 | B1 | 3/2002 | Fleeson |
| 6,366,622 | B1 | 4/2002 | Brown et al. |
| 6,414,963 | B1 | 7/2002 | Gemar |
| 6,624,750 | B1 | 9/2003 | Marman et al. |
| 6,768,901 | B1 | 7/2004 | Osborn et al. |
| 6,785,255 | B2 | 8/2004 | Sastri et al. |
| 6,823,181 | B1 | 11/2004 | Kohno et al. |
| 6,836,506 | B2 | 12/2004 | Anderson |
| 6,901,066 | B1 | 5/2005 | Helgeson |
| 7,207,041 | B2 * | 4/2007 | Elson et al. ............ 718/104 |
| 2002/0011923 | A1 | 1/2002 | Cunningham et al. |
| 2002/0085622 | A1 | 7/2002 | Dhar et al. |
| 2002/0141479 | A1 | 10/2002 | Garcia-Luna-Aceves et al. |
| 2002/0162024 | A1 | 10/2002 | Cunchon et al. |
| 2003/0053555 | A1 | 3/2003 | McCorkle et al. |
| 2003/0063585 | A1 | 4/2003 | Younis et al. |
| 2003/0151513 | A1 | 8/2003 | Herrmann et al. |
| 2003/0198280 | A1 | 10/2003 | Wang et al. |
| 2004/0125775 | A1 | 7/2004 | Rios |
| 2004/0253996 | A1 | 12/2004 | Chen et al. |
| 2005/0281215 | A1 | 12/2005 | Budampati et al. |
| 2006/0064751 | A1 | 3/2006 | Ahuja et al. |
| 2006/0171346 | A1 | 8/2006 | Kolavennu et al. |
| 2006/0200547 | A1 * | 9/2006 | Edwards et al. ............ 709/224 |
| 2007/0030832 | A1 | 2/2007 | Gonia et al. |
| 2007/0104168 | A1 | 5/2007 | Polson |
| 2007/0155423 | A1 | 7/2007 | Carmody et al. |
| 2008/0148342 | A1 * | 6/2008 | Aiyagari et al. ............ 726/1 |
| 2008/0192713 | A1 * | 8/2008 | Mighani et al. ............ 370/338 |

FOREIGN PATENT DOCUMENTS

| | | |
|---|---|---|
| EP | 0 607 562 | 7/1994 |
| EP | 0 893 931 | 1/1999 |
| EP | 1 492 272 A2 | 12/2004 |
| JP | 2004-328184 | 11/2004 |
| WO | WO 00/70572 A1 | 11/2000 |
| WO | WO 02/27640 A3 | 4/2002 |
| WO | WO 03/007162 A1 | 1/2003 |
| WO | WO 03/102705 A1 | 12/2003 |

OTHER PUBLICATIONS

Laurence B. Milstein, "Wideband Code Division Multiple Access", IEEE Journal on Selected Areas in Communications, vol. 18, No. 8, Aug. 2000, p. 1344-1354.

Patrick Kinney, "ZigBee Technology: Wireless Control that Simply Works", Communications Design Conference, Oct. 2, 2003, 20 pages.

Nirav H. Kapadia, et al., "PUNCH: Web Portal for Running Tools", 2000 IEEE, p. 38-47.

Esteban Egea-Lopez, et al., "Wireless communications deployment in industry: a review of issues, options and technologies", Computers in Industry 56 (2005), p. 29-53.

John F. Wilson, et al., "A Single-Chip VHF and UHF Receiver for Radio Paging", IEEE Journal of Solid-State Circuits, vol. 26, No. 12, Dec. 1991, p. 1944-1950.

Roy Want, et al., "The Active Badge Location System", Jun. 17, 2005, 7 pages.

Andreas Savvides, et al., "Dynamic Fine-Grained Localization in Ad-Hoc Networks of Sensors", ACM SigMobile, Jul. 2001, p. 166-179.

M. Rofougaran, et al., "A 900 MHz CMOS RF Power Amplifier with Programmable Output", 1994 Symposium on VLSI Circuits Digest of Technical Papers, 4 pages.

Ahmadreza Rofougaran, et al., "A 1 GHz CMOS RF Front-End IC for a Direct-Conversion Wireless Receiver", IEEE Journal of Solid-State Circuits, vol. 31, No. 7, Jul. 1996, p. 880-889.

Behzad Razavi, "Design Considerations for Direct-Conversion Receivers", IEEE Transactions on Circuits and Systems-II: Analog and Digital Signal Processing, vol. 44, No. 6, Jun. 1997, p. 428-435.

Asis Nasipuri, et al., "A Directionality based Location Discovery Scheme for Wireless Sensor Networks", WSNA 02 Sep. 28, 2002, p. 105-111.

Kenneth W. Moulding, et al., "Gyrator Video Filter IC with Automatic Tuning", IEEE Journal of Solid-State Circuits, vol. SC-15, No. 6, Dec. 1980, p. 963-968.

Nirav H. Kapadia, et al., "PUNCH: An architecture for Web-enabled wide-area network-computing", Cluster Computing 2 (1999), p. 153-164.

Eun-Sun Jung, et al., "Improving IEEE 802.11 Power Saving Mechanism", Jul. 7, 2004, 6 pages.

Steve Blankinship, "Wireless Power Plant Applications Poised for Expansion", Power Engineering, http://pepei.pennnet.com, Sep. 7, 2005, 5 pages.

"ZigBee Alliance, Wireless Control That Simply Works", www.zigbee.org. Feb. 2, 2005, 8 pages.

"Wireless Location Technologies", www.unstrung.com, May 2, 2005, 11 pages.

"Location by Triangulation—Not", posted online Mar. 26, 2005, www.dailywireless.org, 2 pages.

"OSI Model", www.bambooweb.com, May 23, 2005, 5 pages.

"PhasedArray—Personal TelcoWiki", http://wiki.personaltelco.net/index.cgi/PhasedArray?action=print, May 2, 2005, 3 pages.

"Honeywell XYR 5000 Wireless Transmitters, Extending Your Online Measurement Capabilities Easily, Flexibly, Affordably", Honeywell International Inc., Jun. 2005, 2 pages.

"Honeywell XYR Wireless Transmitters, Industrial Measurement & Control", Honeywell International Inc., Oct. 2003, 2 pages.

http://content.honeywell.com/imc/fi/wirelessTransmitters/, Honeywell XYR 5000 Wireless Transmitters, Sep. 7, 2005, 2 pages.

"Wireless Pressure Gage Modernization, Pressure Measurement for all industries", Honeywell International Inc., prior to Dec. 30, 2005, 2 pages.

ARC White Paper, "Honeywell Experion PKS R300", Apr. 2005, 12 pages.

Renato J. Figueiredo, et al., "The PUNCH Virtual File System: Seamless Access to Decentralized Storage Services in a Computational Grid", prior to Dec. 30, 2005, 10 pages.

Jan Crols, et al., "CMOS Wireless Transceiver Design", 1997, 22 pages.

William C. Craig, "Zigbee: Wireless Control That Simply Works", prior at Jun. 17, 2005, 7 pages.

Xiuzhen Cheng, et al., "TPS: A Time-Based Positioning Scheme for Outdoor Wireless Sensor Networks", IEEE InfoCom 2004, 12 pages.

Paul J. Chang, et al., "A CMOS Channel-Select Filter for a Direct-Conversion Wireless Receiver", IEEE Journal of Solid-State Circuits, vol. 32, No. 5, May 1997, p. 722-729.

Asad A. Abidi, "Upconversion and Downconversion Mixers for CMOS Wireless Transceivers", 1996, 42 pages.

Asad A. Abidi, "Direct-Conversion Radio Transceivers for Digital Communications", IEEE Journal of Solid-State Circuits, vol. 30, No. 12, Dec. 1995, p. 1399-1410.

"EmberNet ZigBee, ZigBee Wireless Networking Software", 2004, 2 pages.

Data Sheet, "UAA2082 Advanced pager receiver", Jan. 15, 1996, 41 pages.

"Medium Access Control (MAC) and Physical (PHY) Specifications", ANSI/IEEE std 802.11, 1999 Edition, p. 177-179.

* cited by examiner

APPARATUS AND METHOD SUPPORTING WIRELESS ACCESS TO MULTIPLE SECURITY LAYERS IN AN INDUSTRIAL CONTROL AND AUTOMATION SYSTEM OR OTHER SYSTEM

CROSS-REFERENCE TO RELATED APPLICATIONS

This application claims priority under 35 U.S.C. §119(e) to U.S. Provisional Application No. 60/995,905 filed on Sep. 28, 2007, which is hereby incorporated by reference.

GOVERNMENT RIGHTS

The U.S. Government has a paid-up license in this invention and the right in limited circumstances to require the patent owner to license others on reasonable terms as provided for by terms from the Department of Energy (DoE).

TECHNICAL FIELD

This disclosure relates generally to communication systems and more specifically to an apparatus and method supporting wireless access to multiple security layers in an industrial control and automation system or other system.

BACKGROUND

Processing facilities are often managed using industrial control and automation systems. Example processing facilities include chemical, pharmaceutical, paper, and petrochemical production plants. Among other operations, industrial control and automation systems typically interact with and control industrial equipment in the processing facilities, such as equipment used to produce chemical, pharmaceutical, paper, or petrochemical products.

Industrial control and automation systems routinely include wired components and wireless components. For example, an industrial control and automation system could include a wireless network of sensors that provide data to a wired controller.

In many types of networks, such as corporate and industrial networks, there are often multiple network layers that are subdivided by security paradigm or security domain. For example, industrial sites often use a "Purdue Control System" model divided into multiple levels. Level 1 may, for example, serve process controllers and field input/output devices (such as sensors or actuators). Level 2 may, for example, support process control configuration databases, human-machine interfaces, and (in some cases) complex controls. Level 3 may, for example, support process control historians and advanced supervisory applications. Level 4 may, for example, support business applications and process maintenance applications. A Demilitarized Zone (DMZ) is often set up between Level 3 and Level 4 for wireless applications and for commuting data between Level 3 and Level 4.

Often times, a Process Control Network (PCN) is used to represent Levels 1-3, while a business local area network (LAN) is used to represent Level 4. Each of these levels may have a different security domain, and many best practices champion a security domain for the PCN, a separate security domain for the business LAN, and even a separate security domain for the DMZ.

SUMMARY

This disclosure provides an apparatus and method supporting wireless access to multiple security layers in an industrial control and automation system or other system.

In a first embodiment, a method includes receiving a message at a first wireless node. The first wireless node is associated with a first wired network, and the first wired network is associated with a first security layer. The method also includes transmitting the message over the first wired network when at least one destination of the message is located in the first security layer. The method further includes wirelessly transmitting the message for delivery to a second wireless node when at least one destination of the message is located in a second security layer. The second wireless node is associated with a second wired network, and the second wired network is associated with the second security layer.

In particular embodiments, the first and second security layers are associated with different security paradigms and/or different security domains.

In other particular embodiments, the message is associated with at least one destination located in the first security layer and at least one destination located in the second security layer.

In yet other particular embodiments, the method further includes using a tag in the message and/or contents of the message to identify one or more security layers associated with the message. The transmitting and wirelessly transmitting are based on the one or more identified security layers.

In still other particular embodiments, the method also includes determining whether to filter the message and discarding the message if the message is to be filtered. Also, wirelessly transmitting the message includes wirelessly transmitting the message if the message is not to be filtered. Determining whether to filter the message could include blocking one or more specified types of messages. The first wired network could include a redundant pair of wired networks, and the one or more specified types of messages could include heartbeat traffic associated with the redundant pair of wired networks. Also, the first and second wired networks could be coupled by a wired router, and determining whether to filter the message could include filtering the message to avoid creation of a network loop.

In a second embodiment, an apparatus includes a wired network interface configured to communicate over a first wired network. The first wired network is associated with a first security layer. The apparatus also includes a wireless network interface configured to communicate over a wireless network. The apparatus further includes a controller configured to determine whether a message received through one of the network interfaces has at least one destination located in the first security layer. The controller is also configured to initiate transmission of the message by the wired network interface over the first wired network when at least one destination is located in the first security layer. The controller is further configured to initiate transmission of the message by the wireless network interface over the wireless network when at least one destination of the message is located in a second security layer.

In a third embodiment, a system includes multiple security layers, where the security layers are associated with multiple wired networks. The system also includes multiple gateway nodes, where each gateway node is coupled to one of the wired networks and is associated with one of the security layers. Each of the gateway nodes is configured to receive a message, transmit the message over its associated wired network when at least one destination of the message is located in its associated security layer, and wirelessly transmit the message for delivery to another of the wireless nodes when at least one destination of the message is located in a different one of the security layers.

In a fourth embodiment, a computer readable medium embodies a computer program. The computer program includes computer readable program code for receiving a message at a first wireless node. The first wireless node is associated with a first wired network, and the first wired network is associated with a first security layer. The computer program also includes computer readable program code for initiating transmission of the message over the first wired network when at least one destination of the message is located in the first security layer. The computer program further includes computer readable program code for initiating wireless transmission of the message for delivery to a second wireless node when at least one destination of the message is located in a second security layer. The second wireless node is associated with a second wired network, and the second wired network is associated with the second security layer.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
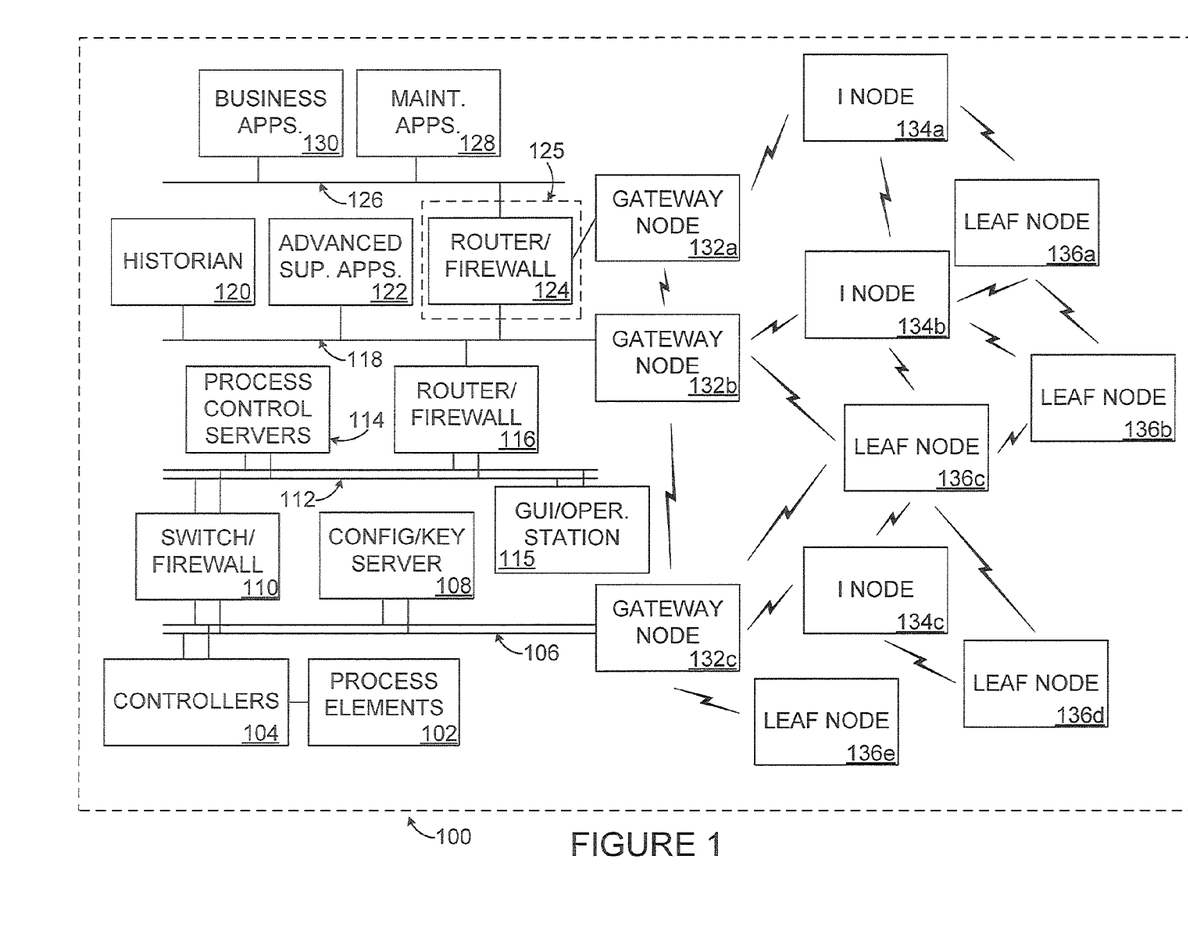
FIG. 1 illustrates an example industrial control and automation system according to this disclosure.
Figure 2:
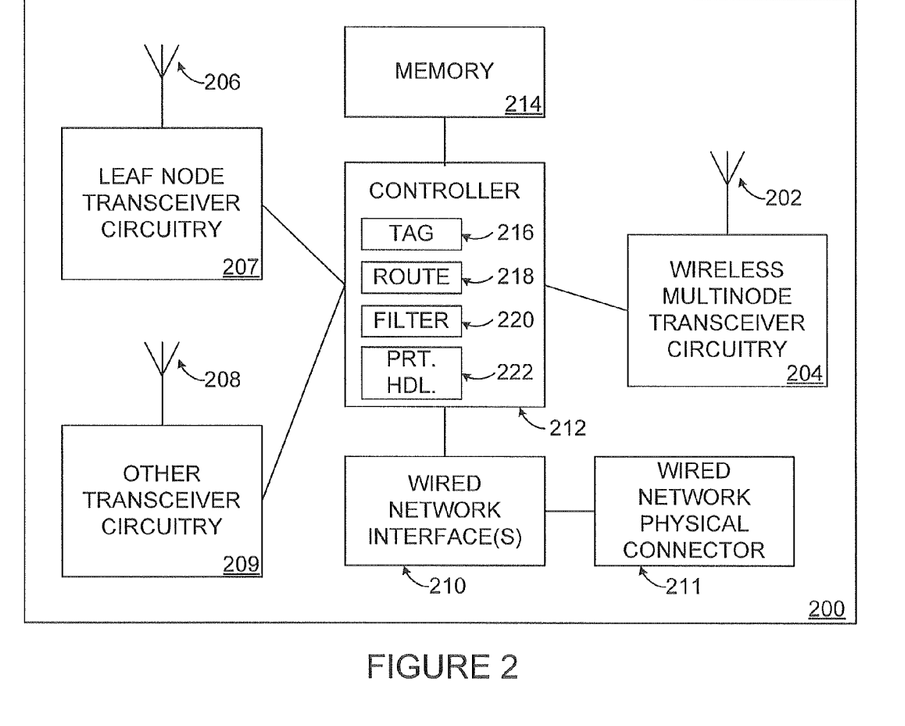
FIG. 2 illustrates an example multinode according to this disclosure.
Figure 3:
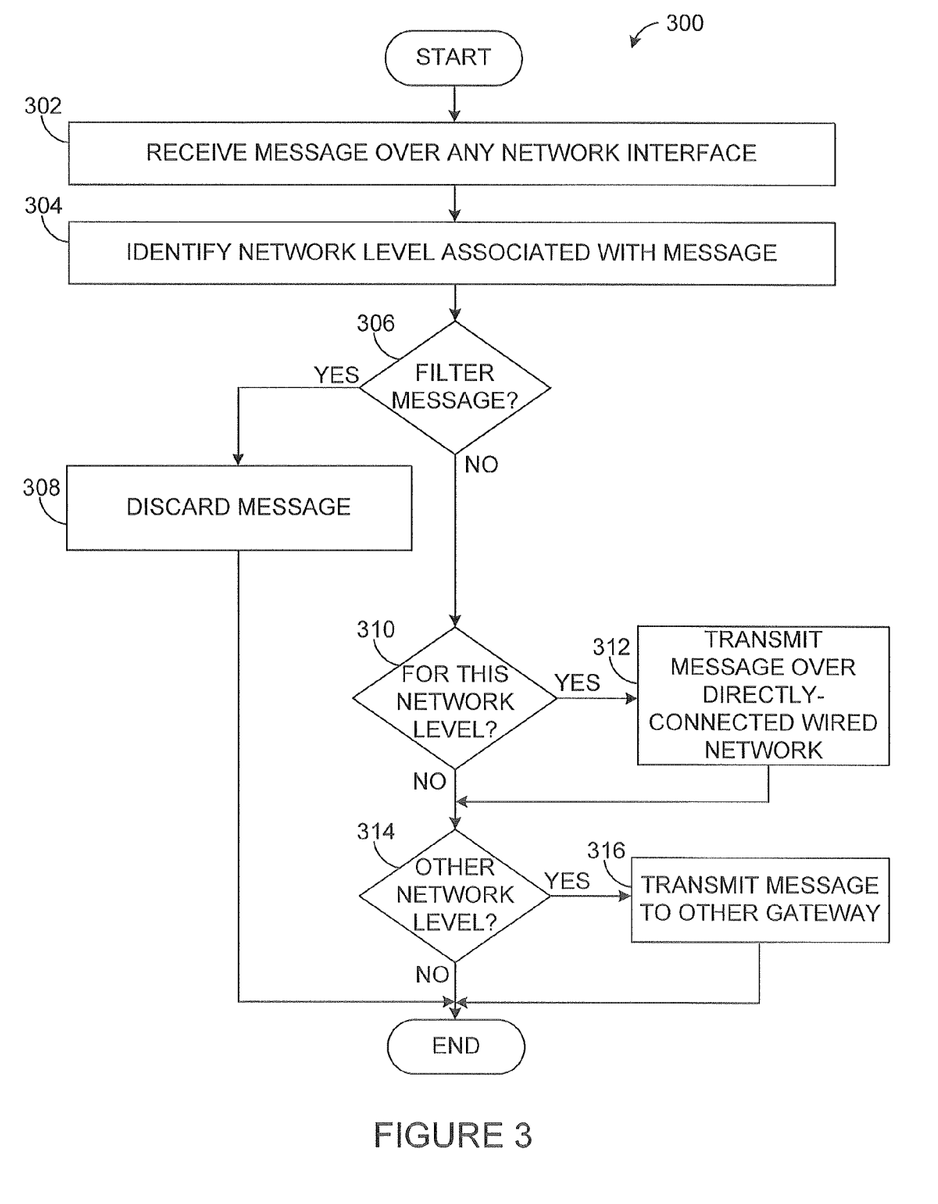
FIG. 3 illustrates an example method for wireless access to multiple security layers in a system according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example industrial control and automation system 100 according to this disclosure. The embodiment of the industrial control and automation system 100 shown in FIG. 1 is for illustration only. Other embodiments of the industrial control and automation system 100 may be used without departing from the scope of this disclosure.

In this example embodiment, the industrial control and automation system 100 includes one or more process elements 102. The process elements 102 represent components in a process or production system that may perform any of a wide variety of functions. For example, the process elements 102 could represent sensors (such as temperature or pressure sensors), actuators (such as valves or pumps), or any other or additional equipment in a processing environment. Each of the process elements 102 includes any suitable structure for performing one or more functions in a processing or production system.

One or more controllers 104 are coupled to the process elements 102. Each controller 104 controls the operation of one or more of the process elements 102. For example, a controller 104 could provide control signals to one or more of the process elements 102, thereby adjusting the operation of those process elements 102. A controller 104 could also receive information associated with the system 100, such as by receiving sensor measurements of a flow rate of material through a pipe. The controller 104 could use this data to control one or more of the process elements 102, such as by controlling a valve using the measured flow rate. Each controller 104 includes any hardware, software, firmware, or combination thereof for controlling one or more process elements 102. A controller 104 could, for example, include one or more processors, one or more memories storing instructions and data used, generated, or collected by the processors, and one or more network interfaces (such as Ethernet interfaces). As a particular example, a controller 104 could represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations. As particular examples, the network 106 could represent a single Ethernet network or a pair of redundant Ethernet networks (such as a FAULT TOLERANT ETHERNET or "FTE" network from HONEYWELL INTERNATIONAL INC.).

A key server 108 is coupled to the network 106 and supports security in the industrial control and automation system 100. For example, the key server 108 could distribute cryptographic keys or other security data to various components in the industrial control and automation system 100, such as to wireless nodes or devices in the system 100. The cryptographic keys or other security data can be used to ensure more secure wireless or other communications in the system 100. The key server 108 includes any hardware, software, firmware, or combination thereof for providing cryptographic keys or other security information to one or more components in the industrial control and automation system 100.

A switch/firewall 110 couples the network 106 to a network 112. The switch/firewall 110 may route traffic from one network to another. The switch/firewall 110 may also block traffic on one network from reaching another network. The switch/firewall 110 includes any suitable structure for providing communication between two networks, such as a HONEYWELL CONTROL FIREWALL (CF9) device. The network 112 could represent any suitable network(s), such as an Ethernet or FTE network.

One or more process control servers 114 are coupled to the network 112. The process control servers 114 perform various functions to support the operation and control of the controllers 104 and process elements 102. For example, the process control servers 114 could log information collected or generated by the controllers 104, such as measurement data or control signals. The process control servers 114 could also execute applications that control the operation of the controllers 104, thereby controlling the operation of the process elements 102. In addition, the process control servers 114 could provide secure access to the controllers 104. Each process control server 114 includes any hardware, software, firmware, or combination thereof for providing access to or control of one or more controllers 104. A process control server 114 could, for example, include one or more processors, one or more memories storing instructions and data used, generated, or collected by the processors, and one or more network interfaces (such as Ethernet interfaces). As a particular example, a process control server 114 could represent a computing device running a MICROSOFT WINDOWS operating system.

One or more graphical user interface (GUI)/operator stations 115 represent computing or communication devices providing user access to various components in the system 100, such as the servers 114. The GUI/operator stations 115 could allow users to review the operational history of sensors and actuators using information collected by the controllers and/or process control servers. The GUI/operator stations 115 could also allow the users to adjust the operation of the sensors, actuators, controllers, or process control servers. The GUI/operator stations 115 could further allow the users to acknowledge alarms and events issued by components within the system 100 or sent to the system 100. Each of the GUI/operator stations 115 includes any hardware, software, firmware, or combination thereof for supporting user access and control of the system 100. Each of the GUI/operator stations 115 could, for example, include one or more processors, one or more memories storing instructions and data used, generated, or collected by the processors, and one or more network interfaces (such as Ethernet interfaces). In particular embodiments, each of the GUI/operator stations 115 could represent a computing device running a MICROSOFT WINDOWS operating system.

A router/firewall 116 couples the network 112 to a network 118. The router/firewall 116 includes any suitable structure for providing communication between two networks, such as a secure router or combination router/firewall. The network 118 could represent any suitable network(s), such as an Ethernet or FTE network.

Additional components are coupled to or communicate over the network 118. For example, a historian 120 could represent a device that collects various information from components of the system 100. This information can be stored for later use, such as in analyzing the performance of the system 100 or identifying problems or areas for improvement in the system 100. Advanced supervisory applications 122 could be used to manage and control the overall operation of the system 100. For example, the system 100 could be used in a processing or production plant or other facility, and the advanced supervisory applications 122 could represent applications used to control the plant or other facility. As particular examples, the advanced supervisory applications 122 could include applications such as enterprise resource planning (ERP), manufacturing execution system (MES), or any other or additional plant or process control applications. The historian 120 and the advanced supervisory applications 122 could be executed on or provided by any suitable device(s), such as server computers.

A router/firewall 124 couples the network 118 to a network 126. The router/firewall 124 includes any suitable structure for providing communication between two networks, such as a switch/firewall. The network 126 could represent any suitable network(s), such as an Ethernet or FTE network.

Additional components are coupled to or communicate over the network 126. For example, maintenance applications 128 could be used to schedule or verify maintenance of components in the system 100, such as maintenance of the process elements 102 or wireless nodes or devices in the system 100 or process equipment monitored or controlled by the system 100. As another example, business applications 130 could represent any suitable type of higher-level applications providing desired functionality in the system 100. The maintenance applications 128 and the business applications 130 could be executed on or provided by any suitable device(s), such as server computers.

In this example, the router/firewall 124 may include, be used within, or otherwise associated with a Demilitarized Zone (DMZ) 125. The DMZ 125 helps to isolate the network 126 and the networks 106, 112, 118. The DMZ 125 could include any number of other components in addition to the router/firewall 124, such as anti-virus software, INTELATRAC server applications, or other applications. These applications could be executed by computing devices coupled to the router/firewall 124 by a wired network in the DMZ 125.

As shown in FIG. 1, the industrial control and automation system 100 also includes one or more wireless networks for communicating with wireless sensors or other wireless devices. In this example, a wireless network is formed using gateway infrastructure nodes 132a-132c, infrastructure nodes ("I nodes") 134a-134c, and leaf nodes 136a-136e. In this document, the term "multinode" may refer to a gateway infrastructure node and/or an infrastructure node.

The infrastructure nodes 134a-134c and the leaf nodes 136a-136e engage in wireless communications with each other. For example, the infrastructure nodes 134a-134c may receive data transmitted over one or more wired networks (such as from networks 106, 118, and 126 via the gateway infrastructure nodes 132a-132c) and wirelessly communicate the data to the leaf nodes 136a-136e. Similarly, the leaf nodes 136a-136e may wirelessly communicate data to the infrastructure nodes 134a-134c for forwarding to one or more wired networks (such as to networks 106, 118, and 126 via the gateway infrastructure nodes 132a-132c). In addition, the infrastructure nodes 134a-134c may wirelessly exchange data with one another. In this way, the nodes 134a-134c and 136a-136e form a wireless network capable of providing wireless coverage to a specified area, such as in a large industrial complex.

In this example, the nodes 134a-134c and 136a-136e are divided into infrastructure nodes and leaf nodes. The infrastructure nodes 134a-134c typically represent line-powered devices, meaning these nodes receive operating power from an external source. As a result, these nodes 134a-134c are typically not limited in their operations since they need not minimize power consumption to increase the operational life of their internal power supplies. On the other hand, the leaf nodes 136a-136e typically represent battery-powered devices, meaning these nodes receive operating power from internal batteries or other power supplies. Because of this, these nodes 136a-136e are often more limited in their operations in order to help preserve the operational life of their internal power supplies. In particular embodiments, the infrastructure nodes 134a-134c could represent routing wireless devices, while the leaf nodes 136a-136e could represent non-routing wireless devices.

Each of the nodes 134a-134c and 136a-136e includes any suitable structure facilitating wireless communications, such as transceiver circuitry and an antenna. Each of the nodes 134a-134c and 136a-136e could also include other functionality, such as functionality for generating or using data communicated over the wireless network. For example, the leaf nodes 136a-136e could represent wireless sensors in an industrial facility, where the leaf nodes are used to measure various characteristics within the facility. These sensors could collect sensor readings and communicate the sensor readings to the controller 104 via the gateway infrastructure nodes 132a-132c. The leaf nodes 136a-136e could also represent actuators that can receive control signals from the controller 104 and adjust the operation of the industrial facility. In this way, the leaf nodes 136a-136e may include or operate in a similar manner as the process elements 102 that are physically connected to the controller 104. As particular examples, the leaf nodes 136a-136e could represent XYR 5000 wireless transmitters, INTELATRAC PKS devices, and MOBILE STATION PKS devices from HONEYWELL INTERNATIONAL INC.

The gateway infrastructure nodes 132a-132c communicate wirelessly with, transmit data to, and receive data from one or more infrastructure nodes 134a-134c and possibly one or more leaf nodes 136a-136e. The gateway infrastructure nodes 132a-132c also communicate wirelessly with, transmit data to, and receive data from each other. The gateway infrastructure nodes 132a-132c may further convert data between the protocol(s) used by the networks 106, 118, and 126 and the protocol(s) used by the nodes 134a-134c and 136a-136e. For instance, the gateway infrastructure nodes 132a-132c could convert Ethernet-formatted data (transported over the networks 106, 118, and 126) into a wireless protocol format (such as the IEEE 802.11a, 802.11b, 802.11g, 802.11n, 802.15.3, 802.15.4, or 802.16 protocol format) used by the nodes 134a-134c and 136a-136e. The gateway infrastructure nodes 132a-132c could also convert data received from one or more of the nodes 134a-134c and 136a-136e into Ethernet-formatted data for transmission over the networks 106, 118, and 126. Beyond that, the gateway infrastructure nodes 132a-132c could support or perform various other functions, such as network creation and security, used to create and maintain a wireless network. In addition, as described below, the gateway infrastructure nodes 132a-132c could support the routing of wireless traffic to the appropriate network level(s) in the system 100.

In some embodiments, the gateway infrastructure nodes and the infrastructure nodes could represent the same type of physical device, but the gateway infrastructure nodes may have extra gateway software modules executing within its code stack in a controller layer, extra code in a network interface layer, and/or other functionality. For the purpose of clear description, gateway infrastructure nodes here may include infrastructure nodes that have been configured to run gateway execution code/functions and configured to act as a gateway between one or more networks. Each gateway infrastructure node 132a-132c includes any suitable structure for providing wirelessly communicated data to one or more network levels in a system. One example embodiment of a multinode (which may include the gateway infrastructure nodes and the infrastructure nodes) is shown in FIG. 2, which is described below.

In particular embodiments, infrastructure nodes (both gateway and other) can be installed in suitable locations in an industrial complex. These locations could be based on a site survey, the application (how the nodes are used), and the wireless protocol(s) used. The site survey could include considerations of light-of-sight access, as well as physical and transient barriers. Gateway infrastructure nodes can also be positioned near locations where wired network access is possible. Antennas associated with the nodes could be positioned on, next to, or apart from the nodes themselves. Power requirements for the nodes and their antennas can also be considered when selecting locations for the nodes. In addition, the nodes can be placed in locations where the wireless coverage is non-existent or limited in areas outside of the industrial complex's physical boundaries.

In one aspect of operation, the system 100 may be divided into different portions or levels. For example, the network 106 may represent a Level 1 control network layer that includes or is coupled to controllers 104 (which are coupled to the process elements 102). The network 112 may represent a Level 2 control network layer that includes or is coupled to the process control servers 114 and other components, such as GUI interfaces (operator stations), advanced controllers (like HONEYWELL's APP NODE, ACE NODE, and EXPERION PKS server), alarm managers, system configuration files, and local historians. The network 118 may represent a Level 3 advanced application network layer that includes or is coupled to the historian 120 and advanced supervisory applications 122 (which could include optimizers, advanced controls like HONEYWELL's RMPCT PROFIT CONTROLLER, and historian collector nodes). The network 126 may represent a Level 4 layer that includes or is coupled to the maintenance applications 128 and business applications 130 (such as domain controllers and RADIUS servers). Levels 1-3 may be referred to collectively as a process control network (PCN). Everything above the network 118 could be referred to as a business LAN, and the DMZ 125 may be located between networks 118 and 126 (such as in router/firewall 124, in another device, or separately). The DMZ 125 may allow the PCN to push data up to the DMZ 125, and a node on the DMZ 125 may serve data to clients on the DMZ 125 or on the business LAN (network 126). This may be done for security purposes to prevent business application clients and DMZ applications and clients from directly requesting data from the PCN. Each of these levels in the system 100 could be associated with a security paradigm or security domain, and the security paradigms or security domains in the system 100 could differ from level to level.

One problem in conventional systems is that data from a wireless network often needs to be brought into different network levels of a system. For example, some data may need to be brought into one network level of a system, while other data traversing the wireless network may need to go to a different network level of the system. A specific example is when process variable data from a sensor needs to go to a controller, while diagnostic data (which the controller does not need) needs to go to a maintenance application. It is often difficult in conventional systems for this data to be routed appropriately to the different network levels of the system without violating the security paradigms/domains of the respective levels. Also, it is often difficult for data from a single device (such as a field I/O device like a sensor) to be parsed and routed so that business LAN information (like diagnostic information) from the device goes only to the business LAN, while process variable, mode, and process critical alarms continue to go only to the process control network.

In accordance with this disclosure, the gateway infrastructure nodes 132a-132c can serve as access points for the infrastructure nodes 134a-134c and the leaf nodes 136a-136e, while also acting as gateways to multiple network levels within the system 100. Moreover, the gateway infrastructure nodes 132a-132c support a protocol and/or a device configuration that allows traffic from the infrastructure nodes 134a-134c and the leaf nodes 136a-136e to be routed to appropriate levels within the system 100. For example, data from a particular sensor (leaf node) could be received by a gateway infrastructure node (such as gateway infrastructure node 132a). The gateway infrastructure node can determine whether the data it receives needs to be provided to the network level associated with that gateway infrastructure node or to the network level associated with a different gateway infrastructure node. If the received data needs to be provided to the network level associated with that gateway infrastructure node, the gateway infrastructure node can transmit the data over its local wired network (such as network 106). If the received data needs to be provided to a different network level, the gateway infrastructure node can transmit the data to another gateway infrastructure node (either directly or indirectly through other nodes, such as other gateway infrastructure nodes or infrastructure nodes). In this way, data can be provided to the appropriate network level via the gateway infrastructure nodes 132a-132c, without encountering various problems associated with traversing different security paradigms or security domains in the wired networks.

While not shown, multiple gateway infrastructure nodes can be connected to one network level and serve as multiple gateways to that level (multiple gateway infrastructure nodes can be active at the same time). Also, multiple gateway infrastructure nodes in the same system 100 can also be connected to different network levels. A network formed by the gateway infrastructure nodes may support multiple connections at different levels. This may, for example, allow for virtual traffic separation over a single physical wireless network.

In particular embodiments, the gateway infrastructure nodes 132a-132c can separate traffic for different network levels using multiple virtual LANs (VLANs), multiple Virtual Private Networks (VPNs), and/or multiple service set identifiers (SSIDs). Traffic for each level could use a different VLAN, VPN, and/or SSID. The gateway infrastructure nodes 132a-132c and other nodes (such as the infrastructure and leaf nodes) could also support the marking of messages, where messages are tagged to identify the levels within the system 100 where the messages are destined. This may allow the gateway infrastructure nodes 132a-132c to more efficiently parse out or route messages to the appropriate destinations. As a particular example, the marking could include marking messages for a single level or for multiple levels within a system, which may allow the gateway infrastructure nodes 132a-132c to parse out or route messages to the appropriate destinations. As another particular example, the tagging of data that originates on the wireless network (or by a wireless device) can be used to allow the gateway infrastructure nodes 132a-132c to differentiate between wireless and wired data so that better filtering can be done to prevent unnecessary clogging wired traffic from reaching the wireless network. This tagging can further be used to allow the gateway infrastructure nodes 132a-132c to filter network traffic to allow the wireless network to connect to different wired networks that are already connected via a wired router without causing a network loop.

The following represent specific examples of how a protocol and/or a device configuration may allow data associated with a single device to be provided to one or multiple network levels within a system. For example, the device configuration and/or the protocol may allow one or more gateway infrastructure nodes 132a-132c to recognize and route a process variable message from a wireless field I/O device (such as a wireless leaf node) to Level 1 for use by a controller 104. The same wireless field I/O device may later generate a diagnostic message that only has value for a maintenance application 128 on Level 4. In this case, the diagnostic message may be recognized appropriately by one or more gateway infrastructure nodes 132a-132c and sent to the maintenance application 128 on Level 4 (without requiring the message to be sent through Levels 1-3 first). Additionally, there may be mobile human-machine interface devices, such as tablet PCs, in the wireless network. These device could have their information (such as read/write requests) routed to the DMZ 125 via one or more gateway infrastructure nodes 132a-132c acting as gateways at the appropriate level(s). This could occur even when the tablet PCs or other devices are in an area that predominantly serves, for example, Level 1 traffic. Among other things, this may allow the gateway infrastructure nodes 132a-132c to support virtual traffic separation over a single physical wireless network.

Note that any suitable security mechanisms could be used here. As noted above, cryptographic keys can be used by devices in the system 100. Other security mechanisms include firewalls (various ones of which have been described above), media access control (MAC) filtering, VLANs, VPNs, and Remote Access Dial-Up User Service (RADIUS). These mechanisms could be used in any suitable locations within the system 100.

Although FIG. 1 illustrates one example of an industrial control and automation system 100, various changes may be made to FIG. 1. For example, the industrial control and automation system 100 could include any number of process elements, controllers, wired networks, servers, applications, gateway infrastructure nodes, infrastructure nodes, leaf nodes, and other components. Also, the functional division shown in FIG. 1 is for illustration only. Various components in FIG. 1 could be combined or omitted and additional components could be added according to particular needs. Further, while described as including a single wireless network, the industrial control and automation system 100 could support any number of wireless networks. Beyond that, the communication paths and system layout in FIG. 1 are for illustration only and can be changed depending on the implementation. As a particular example, the wireless nodes (132a-132c, 134a-134c, 136a-136e) in FIG. 1 could communicate with each other in any suitable arrangement. In addition, FIG. 1 illustrates one operational environment in which access to multiple network layers in a system can be used. This functionality could be used in any suitable industrial control and automation or non-industrial control and automation system or environment.

FIG. 2 illustrates an example multinode 200 according to this disclosure. The embodiment of the multinode 200 shown in FIG. 2 is for illustration only. Other embodiments of the multinode 200 could be used without departing from the scope of this disclosure. Also, for ease of explanation, the multinode 200 in FIG. 2 is discussed with reference to the system 100 of FIG. 1. The multinode 200 could be used in any other suitable system.

In this example, the multinode 200 could represent the gateway infrastructure nodes and the infrastructure nodes of FIG. 1. As shown in FIG. 2, the multinode 200 includes an antenna 202 and wireless multinode transceiver circuitry 204. The antenna 202 and transceiver circuitry 204 facilitate wireless communications between the multinode 200 and, for example, other multinodes (such as other gateway infrastructure nodes and/or infrastructure nodes). Any suitable wireless technology could be used to communicate with the wireless nodes, such as radio frequency (RF) signals (including 900 MHz, 2.4 GHz, 5.8 GHz, or other RF signals). As particular examples, the nodes could communicate using an IEEE 802.11a, 802.11b, 802.11g, 802.11n, 802.15.3, 802.15.4, or 802.16 protocol format. The antenna 202 represents any suitable structure for transmitting and receiving wireless signals, such as an RF antenna. The transceiver circuitry 204 includes any suitable structure for facilitating wireless communications using the antenna 202. The transceiver circuitry 204 could, for example, include amplifiers, filters, and analog-to-digital converters for processing incoming signals and amplifiers, filters, and digital-to-analog converters for processing outgoing signals.

In a similar manner, the multinode 200 also includes an antenna 206 and leaf node transceiver circuitry 207. The antenna 206 and transceiver circuitry 207 facilitate wireless communications between the multinode 200 and one or more leaf nodes 136a-136e, such as wireless sensors and actuators. Any suitable wireless technology could be used to communicate with the leaf nodes, such as RF signals (including 900 MHz, 2.4 GHz, 5.8 GHz, or other RF signals). The antenna 206 represents any suitable structure for transmitting and receiving wireless signals, such as an RF antenna. The transceiver circuitry 207 includes any suitable structure for facilitating wireless communications using the antenna 206.

In addition, the multinode 200 also includes an antenna 208 and other transceiver circuitry 209. The antenna 208 and transceiver circuitry 209 facilitate wireless communications between the multinode 200 and portable or other user devices, such as 802.11-compliant laptop computers, handheld devices, or other devices. In particular embodiments, the antenna 208 and transceiver circuitry 209 could facilitate wireless communications using WiFi communications. Note that any suitable wireless technology could be used to communicate with the user devices, such as RF signals (including 900 MHz, 2.4 GHz, 5.8 GHz, or other RF signals). The antenna 208 represents any suitable structure for transmitting and receiving wireless signals, such as an RF antenna. The transceiver circuitry 209 includes any suitable structure for facilitating wireless communications using the antenna 208.

One or more wired network interfaces 210 allow the multinode 200 to communicate over one or more wired networks (if configured to operate as a gateway infrastructure node). For example, a single network interface 210 could allow the multinode 200 to communicate over a single Ethernet network, and a pair of network interfaces 210 could allow the multinode 200 to communicate over an FTE network. The use of Ethernet here is for illustration only, and any other or additional network protocol(s) could be used by the multinode 200. Each network interface 210 includes any suitable structure facilitating communications over a wired network. A wired network physical connector 211 physically couples the wired network interface 210 to a wired network, such as to a physical cable. The wired network physical connector 211 represents any suitable physical connector, such as a female RJ-45 jack.

In this example, the multinode 200 includes a controller 212 and a memory 214. The controller 212 controls the overall operation of the multinode 200. For example, as described below, the controller 212 could control the routing of messages from sensors or other infrastructure/leaf nodes. These messages can be routed to either (i) the network interface 210 when the messages contain data for the network level associated with the multinode 200 or (ii) the transceiver circuitry 204 for communication to another multinode (gateway infrastructure or infrastructure) when the messages contain data for the network level associated with another multinode. The controller 212 includes any suitable hardware, software, firmware, or combination thereof for controlling the multinode 200. The controller 212 could, for example, represent a microprocessor, microcontroller, application specific integrated circuit (ASIC), state machine, combinational logic, or any other hardware, software, firmware, or combination thereof. The memory 214 represents any suitable storage and retrieval device or devices, such as volatile and/or non-volatile memory. The memory 214 could be used to store any suitable data, such as instructions used by the controller 212 and/or data used, generated, or collected by the controller 212.

In this example, the controller 212 includes, executes, or otherwise provides various functions to support the operation of the multinode 200. These functions are for illustration only. Any other or additional functions could be used to support the operation of the multinode 200. Also, these functions could be implemented in any suitable manner, such as by using software/firmware instructions executed by the controller 212 and/or by using hardware in the controller 212.

A tagging function 216 supports the tagging or marking of various messages handled by the multinode 200. For example, the tagging function 216 could allow the controller 212 to examine a received message and determine the network level(s) to which the message is destined. As a particular example, process values from a sensor or other node could be destined for Level 1, while diagnostic information could be destined for Level 4. The controller 212 can use any suitable technique to determine the level or levels to which a specific message is directed. For instance, the controller 212 could examine the contents of a message to identify the likely destination level for the message. The controller 212 could also use data embedded in or associated with a message (such as data inserted into the message by a sensor) that identifies the level to which it is directed. Although the tagging function 212 is shown here as residing within the controller 212 in the multinode 200, the tagging function could be implemented in any node or other component in the system 100, such as by the component that generates a message.

A routing function 218 supports the routing of messages to the appropriate network level in the system 100. For example, the routing function 218 could route data from a wired network (received via the network interface 210) to one or more wireless nodes (sent via the wireless multinode transceiver circuitry 204, the leaf node transceiver circuitry 207, or the other transceiver circuitry 209). The routing function 218 could also route data from one or more wireless nodes (received via the wireless multinode transceiver circuitry 204, the leaf node transceiver circuitry 207, or the other transceiver circuitry 209) to either a wired network (sent via the network interface 210), another multinode (sent via the transceiver circuitry 204), or a leaf node or other device (sent via the leaf node transceiver circuitry 207 or the other transceiver circuitry 209). The decision whether to route data from one or more wireless nodes to a wired network or another multinode could be based on the tagging of the data. Data tagged as being destined for the network level associated with the multinode 200 could be sent to the network interface 210, while data tagged as being destined for another network level could be sent to the transceiver circuitry 204.

A filter function 220 can be used to prevent certain data from being passed to and/or from the wireless network. For example, FTE networks routinely include components that periodically broadcast "heartbeat" traffic. The "heartbeat" traffic allows components in the FTE network to identify communication paths through the FTE network. However, this type of traffic is routinely not needed by wireless components, and the filter function 220 could block this traffic from reaching the wireless network. Similarly, the wireless network could support redundant paths from a leaf node to a multinode, and multiple copies of the same message could reach the multinode 200 through different paths. The filter function 220 could identify copies of wirelessly transmitted messages and provide one copy of the message to the wired network.

A protocol handler 222 handles or maps one communication or device protocol to another. It also handles tunneling, allowing messages to be "wrapped" in a host protocol (such as by wrapping wired network messages into the wireless protocol). According to the ISA 100 standards, a portion of this function could be performed by the leaf nodes 136a-136e, as well. In any event, the output of the protocol handler 222 can be provided to the tagging function 216 or, if already tagged, to the routing function 218. Additional details of the protocol handler 222 can be found in the following U.S.

patent publications, which are incorporated by reference: U.S. Patent Publication No. 2007/0025246, U.S. Patent Publication No. 2007/0280144, U.S. Patent Publication No. 2007/0280178, and U.S. Patent Publication No. 2007/0280286.

Although FIG. 2 illustrates one example of a multinode 200, various changes may be made to FIG. 2. For example, the functional division in FIG. 2 is for illustration only. Various components in FIG. 2 could be combined or omitted and additional components could be added according to particular needs. Also, the functionality of the multinode 200 could be implemented in any other suitable manner and is not limited to the specific components shown in FIG. 2. In addition, a "wireless node" represents any device that can transmit and/or receive data wirelessly, even if the "wireless node" has the ability to transmit and/or receive data over a wired connection as well.

FIG. 3 illustrates an example method 300 for wireless access to multiple security layers in a system according to this disclosure. The embodiment of the method 300 shown in FIG. 3 is for illustration only. Other embodiments of the method 300 could be used without departing from the scope of this disclosure.

A message is received over a network interface at step 302. This could include, for example, the multinode 200 receiving the message wirelessly via the antenna 202 and transceiver circuitry 204, the antenna 206 and transceiver circuitry 207, or the antenna 208 and transceiver circuitry 209. This could also include the multinode 200 receiving the message over its wired network interface(s) 210. The message could come from any suitable source, such as another multinode (infrastructure node or gateway infrastructure node), a portable user device, a wireless sensor, actuator, or other leaf node, or a wired component.

One or more network levels associated with the message are identified at step 304. This could include, for example, the controller 212 identifying a tag in the message, where the tag identifies the network level(s) associated with the message (such as the network level of a message destination). This could also include the controller 212 generating a tag for the message or otherwise identifying the network level(s) to receive the message.

A determination is made whether to filter the message at step 306. This could include, for example, the controller 212 determining whether the message represents FTE heartbeat traffic or other messages not intended for or not needing further transmission. If the message should be filtered, the multinode discards the message at step 308.

Otherwise, the multinode is associated with one of multiple network levels, and a determination is made whether the message is destined for that network level at step 310. If so, the message is transmitted over a wired network at step 312. This could include, for example, the controller 212 transmitting the message over one or more wired networks via its wired network interface(s) 210. The message's contents could be transmitted as received or modified in any suitable manner.

A determination is also made whether the message is destined for a different network level at step 314. If so, the message is transmitted to at least one other gateway at step 316. This could include, for example, the controller 212 transmitting the message to one or more gateway infrastructure nodes via its antenna 202 and transceiver circuitry 204. The message could be transmitted to a gateway infrastructure node directly or indirectly. Also, the message could be modified in any suitable manner, such as to include the appropriate network address or other identifier associated with the at least one other gateway.

Although FIG. 3 illustrates one example of a method 300 for wireless access to multiple security layers in a system, various changes may be made to FIG. 3. For example, while shown as a series of steps, various steps in FIG. 3 may overlap, occur in parallel, occur multiple times, or occur in a different order. As a particular example, steps 302-312 could be repeated multiple times, and steps 314-316 could be repeated multiple times. As another particular example, steps 302-312 could occur while steps 314-316 are occurring (enabling the processing of messages received over a wireless network and messages received over a wired network). Also, other steps could occur during the processing of messages received over a wireless or wired network, such as when filtering is performed to determine whether to forward a message received over the wireless network.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc or digital versatile disc (DVD), or any other type of medium.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A method comprising:
    receiving a message from a wireless leaf node at a first wireless node, the first wireless node connected to a first wired network, the first wired network associated with a first security layer;
    using a tag to identify one or more security layers associated with the message;
    determining whether to filter the message;
    discarding the message if the message is to be filtered;
    if the message is not to be filtered:
        transmitting the message over the first wired network when at least one destination of the message is located in the first security layer, wherein the transmitting is based on the one or more identified security layers; and
        wirelessly transmitting the message for delivery to a second wireless node when at least one destination of the message is located in a second security layer, the second wireless node associated with a second wired network, the second wired network associated with the second security layer, wherein the wirelessly transmitting is based on the one or more identified security layers;
    receiving a second message from a mobile human-machine interface device; and
    transmitting the received second message to a Demilitarized Zone (DMZ) for secure routing between two of the security layers;
    wherein the first and second wired networks are coupled by a wired router; and
    wherein determining whether to filter the message comprises determining whether to filter the message in order to avoid creation of a network loop.

2. The method of claim 1, wherein at least one of:
    the first and second security layers are associated with different security paradigms; and
    the first and second security layers are associated with different security domains.

3. The method of claim 1, wherein the message is associated with at least one destination located in the first security layer and at least one destination located in the second security layer.

4. The method of claim 1, further comprising:
    using the tag and other contents of the message to identify the one or more security layers associated with the message.

5. The method of claim 4, wherein using the tag and the other contents of the message to identify the one or more security layers comprises:
    determining that the message is associated with a lower security layer in a process control network when the message comprises process variable data from the wireless leaf node; and
    determining that the message is associated with a higher security layer in a business network when the message comprises diagnostic data from the wireless leaf node.

6. The method of claim 1, wherein wirelessly transmitting the message for delivery to the second wireless node comprises one of:
    wirelessly transmitting the message directly to the second wireless node; and
    wirelessly transmitting the message indirectly to the second wireless node through one or more intermediate wireless nodes.

7. The method of claim 1, wherein determining whether to filter the message further comprises blocking one or more specified types of messages.

8. The method of claim 7, wherein:
    the first wired network comprises a redundant pair of wired networks; and
    the one or more specified types of messages comprise heartbeat traffic associated with the redundant pair of wired networks.

9. An apparatus comprising:
    a wired network interface configured to communicate over a first wired network, the first wired network associated with a first security layer;
    a wireless network interface configured to communicate over a wireless network; and
    a controller configured to:
        receive a message from a wireless leaf node through the wireless network interface;
        identify one or more security layers associated with the message;
        determine whether to filter the message;
        discard the message if the message is to be filtered;
        if the message is not to be filtered:
            based on the one or more identified security layers, initiate transmission of the message by the wired network interface over the first wired network when at least one destination is located in the first security layer; and
            based on the one or more identified security layers, initiate transmission of the message by the wireless network interface over the wireless network when at least one destination of the message is located in a second security layer associated with a second wired network;
        receive a second message from a mobile human-machine interface device; and
        transmit the received second message to a Demilitarized Zone (DMZ) for secure routing between two of the security layers;
    wherein the controller is configured to determine whether to filter the message by determining whether to filter the message in order to avoid creation of a network loop when the first and second wired networks are coupled by a wired router.

10. The apparatus of claim 9, wherein the wireless network interface is configured to transmit the message to a second apparatus associated with the second wired network.

11. The apparatus of claim 9, wherein the controller is configured to determine whether the message has at least one destination located in the first security layer using the tag and at least one of: the at least one destination of the message and contents of the message.

12. The apparatus of claim 9, wherein:
    the wired network interface comprises two Ethernet interfaces configured to communicate over a redundant pair of wired Ethernet networks; and
    the wireless network interface comprises multiple wireless transceivers, each of the wireless transceivers configured to communicate with different types of wireless devices.

13. A system comprising:
    multiple security layers, the security layers associated with multiple wired networks; and
    multiple gateway nodes, each gateway node coupled to one of the wired networks and associated with one of the security layers, wherein each of the gateway nodes is configured to:

receive a message from a wireless leaf node;
use a tag to identify one or more of the security layers associated with the message;
determine whether to filter the message;
discard the message if the message is to be filtered;
if the message is not to be filtered:
based on the one or more identified security layers, transmit the message over its associated wired network when at least one destination of the message is located in its associated security layer; and
based on the one or more identified security layers, wirelessly transmit the message for delivery to another of the gateway nodes when at least one destination of the message is located in a different one of the security layers;
receive a second message from a mobile human-machine interface device; and
transmit the received second message to a Demilitarized Zone (DMZ) for secure routing between two of the security layers;
wherein each gateway is configured to determine whether to filter the message by determining whether to filter the message in order to avoid creation of a network loop when at least two of the wired networks are coupled by a wired router.

14. The system of claim 13, wherein at least one of:
at least some of the security layers are associated with different security paradigms; and
at least some of the security layers are associated with different security domains.

15. The system of claim 13, further comprising:
multiple wireless leaf nodes configured to provide multiple messages to the gateway nodes.

16. The system of claim 15, wherein:
at least one of the gateway nodes and the leaf nodes is configured to identify one or more security layers associated with each message; and
the gateway nodes are configured to route the messages based on the one or more identified security layers for each message.

17. The system of claim 13, wherein at least two of the gateway nodes are coupled to a common one of the wired networks and are configured to be active at a common time.

18. A non-transitory computer readable medium embodying a computer program, the computer program comprising:
computer readable program code for receiving a message from a wireless leaf node at a first wireless node, the first wireless node connected to a first wired network, the first wired network associated with a first security layer;
computer readable program code for using a tag to identify one or more security layers associated with the message;
computer readable program code for determining whether to filter the message;
computer readable program code for discarding the message if the message is to be filtered;
computer readable program code for, if the message is not to be filtered:
initiating, based on the one or more identified security layers, transmission of the message over the first wired network when at least one destination of the message is located in the first security layer; and
initiating, based on the one or more identified security layers, wireless transmission of the message for delivery to a second wireless node when at least one destination of the message is located in a second security layer, the second wireless node associated with a second wired network, the second wired network associated with the second security layer;
computer readable program code for receiving a second message from a mobile human-machine interface device; and
computer readable program code for transmitting the received second message to a Demilitarized Zone (DMZ) for secure routing between two of the security layers;
wherein the computer readable program code for determining whether to filter the message comprises computer readable program code for determining whether to filter the message in order to avoid creation of a network loop when the first and second wired networks are coupled by a wired router.

19. The method of claim 1, further comprising:
identifying, at the first wireless node, whether contents of the message include one of process values and diagnostic information from the wireless leaf node;
if the message contains process values, transmitting the message from the first wireless node to a lower security layer in a process control network; and
if the message contains diagnostic information, transmitting the message from the first wireless node to a higher security layer in a business network.

20. The method of claim 1, wherein the first wireless node separates messages for different network levels using the tag and multiple virtual local area networks.

21. The method of claim 1, wherein the second message comprises a read/write request from the mobile human-machine interface device.

22. The method of claim 1, further comprising:
generating the tag using data inserted into the message by the wireless leaf node.

23. The method of claim 1, wherein determining whether to filter the message comprises determining whether the message is a copy of another message received at the first wireless node.

* * * * *